United States Patent [19]
Reed et al.

[11] Patent Number: 6,133,381
[45] Date of Patent: Oct. 17, 2000

[54] BROMINATED POLYSTYRENIC FLAME RETARDANTS

[75] Inventors: Jon S. Reed; Charles H. Kolich; Billie B. Dadgar; Donald E. Balhoff; Meng-Sheng Ao; Homer C. Lin, all of Baton Rouge, La.; Thorsten W. Brockmann, Columbia, S.C.; David R. Brackenridge, Baton Rouge, La.

[73] Assignee: Albelmarle Corporation, Richmond, Va.

[21] Appl. No.: 09/066,172

[22] Filed: Apr. 24, 1998

Related U.S. Application Data

[63] Continuation-in-part of application No. 08/852,462, May 7, 1997, which is a continuation-in-part of application No. 08/727,341, Sep. 26, 1996, Pat. No. 5,677,390.

[51] Int. Cl.[7] ........................................................ C08F 8/42
[52] U.S. Cl. .................. 525/333.4; 525/367; 525/369
[58] Field of Search ............................... 525/333.4, 367, 525/369

[56] References Cited

U.S. PATENT DOCUMENTS

| | | | |
|---|---|---|---|
| 1,890,772 | 12/1932 | Dykstra | 260/93.5 |
| 2,199,026 | 4/1940 | Levine et al. | 260/74 |
| 2,823,201 | 2/1958 | Wheaton | 260/93.5 |
| 3,009,906 | 11/1961 | Eichhorn et al. | 260/93.5 |
| 3,039,977 | 6/1962 | Ingram | 260/2.5 |
| 3,050,476 | 8/1962 | Tress et al. | 260/2.5 |
| 3,132,045 | 5/1964 | Hill | 117/138 |
| 3,474,067 | 10/1969 | Praetzel et al. | 260/2.5 |
| 3,506,741 | 4/1970 | Trepka et al. | 260/889 |
| 3,534,012 | 10/1970 | Dennis | 260/91.5 |
| 3,932,542 | 1/1976 | Gerns | 260/650 R |
| 3,959,398 | 5/1976 | Jalics | 260/650 R |
| 3,975,354 | 8/1976 | Buxbaum et al. | 260/40 R |
| 4,028,486 | 6/1977 | Jalics | 526/293 |
| 4,074,032 | 2/1978 | Naarmann et al. | 526/44 |
| 4,107,231 | 8/1978 | Wurmb et al. | 260/873 |
| 4,143,221 | 3/1979 | Naarmann et al. | 526/44 |
| 4,151,223 | 4/1979 | Neuberz et al. | 260/873 |
| 4,178,327 | 12/1979 | Hall et al. | 525/169 |
| 4,200,703 | 4/1980 | Diebel et al. | 525/357 |
| 4,352,909 | 10/1982 | Barda et al. | 525/157 |
| 4,360,455 | 11/1982 | Lindenschmidt et al. | 252/609 |
| 4,389,517 | 6/1983 | Priddy et al. | 526/64 |
| 4,501,859 | 2/1985 | Newman et al. | 525/356 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,636,554 | 1/1987 | Tada et al. | 525/359.3 |
| 4,650,832 | 3/1987 | Kowalski et al. | 525/354 |
| 4,748,286 | 5/1988 | Daren et al. | 570/200 |
| 4,832,873 | 5/1989 | Favstritsky et al. | 252/601 |
| 4,835,222 | 5/1989 | Sypniewski | 525/359.5 |
| 4,879,353 | 11/1989 | Sanders et al. | 525/357 |
| 4,975,496 | 12/1990 | Tigner et al. | 525/357 |
| 5,112,896 | 5/1992 | Dever et al. | 524/412 |
| 5,112,897 | 5/1992 | Dever et al. | 524/412 |
| 5,112,898 | 5/1992 | Dever et al. | 524/412 |
| 5,194,482 | 3/1993 | Chundury et al. | 524/412 |
| 5,235,000 | 8/1993 | McKinnie | 525/355 |
| 5,243,109 | 9/1993 | Kornberg et al. | 570/193 |
| 5,304,618 | 4/1994 | Atwell et al. | 526/293 |
| 5,326,837 | 7/1994 | Kissin | 526/150 |
| 5,328,983 | 7/1994 | Favstritsky et al. | 528/490 |
| 5,334,680 | 8/1994 | Mukai | 526/207 |
| 5,369,202 | 11/1994 | Atwell et al. | 526/293 |
| 5,532,322 | 7/1996 | Kadono et al. | 525/357 |
| 5,637,650 | 6/1997 | Gill et al. | 525/356 |
| 5,677,390 | 10/1997 | Dadgar et al. | 525/355 |
| 5,686,538 | 11/1997 | Balhoff et al. | 525/355 |
| 5,723,549 | 3/1998 | Dever et al. | 525/333.4 |
| 5,726,252 | 3/1998 | Gill et al. | 525/333.3 |
| 5,767,203 | 6/1998 | Ao et al. | 525/355 |
| B1 4,200,703 | 7/1987 | Diebel et al. | 525/340 |

FOREIGN PATENT DOCUMENTS

| | | |
|---|---|---|
| 0020294 | 12/1980 | European Pat. Off. . |
| 0139931 | 5/1985 | European Pat. Off. . |
| 0201411 | 11/1986 | European Pat. Off. . |
| 0277429 | 8/1988 | European Pat. Off. . |
| 61-034723 | 8/1986 | Japan . |
| 63-150349 | 6/1988 | Japan . |
| 2215807 | 8/1990 | Japan . |
| 1589700 | 5/1981 | United Kingdom . |
| 9503341 | 2/1995 | WIPO . |

OTHER PUBLICATIONS

Brochure from Ferro Corporation, Fire Retardant Chemical Association, Fall 1992 Conference, "Brominated Polystyrene Flame Retardant Additives", pp. 141–150.
Derwent Abstract of JP 8053511, Feb. 1996.
Patent Abstracts of Japan (European Patent Office)—Abstract of JP 051 70809, publication date of Dec. 1991 to Tosoh Corporation.
Brochure from Ferro Corporation, Product Information, Pyro–Chek 68PB & Pyro–Chek 60PB, Brominated Polystyrene Flame–Retardant Additives, 1968.

*Primary Examiner*—Bernard Lipman
*Attorney, Agent, or Firm*—E. E. Spielman, Jr.

[57] ABSTRACT

This invention relates to a thermally stable brominated polystyrene composition which contains alkali metal base (e.g., NaOH) in an amount less than about 1 wt % such that if the flame retardant is dissolved in bromochloromethane and the resultant solution is extracted with water, the resultant water extract exhibits a pH of at least about 9.0. A preferred composition of this type even when heated to 315° C. for one hour did not undergo darkening—the color remained tan. Comparative samples not containing the base turned black under these same conditions. Especially useful compositions additionally have less than 500 ppm, and better still, less than 100 ppm total Cl, and at least about 67 wt % bromine. Processes for producing the compositions are also described.

76 Claims, 1 Drawing Sheet

FIG. 1

BROMINATED POLYSTYRENIC FLAME RETARDANTS

REFERENCE TO RELATED APPLICATION

This application is a continuation-in-part of commonly-owned co-pending application Ser. No. 08/852,462, filed May 7, 1997 pending, which in turn is a continuation-in-part of commonly-owned application Ser. No. 08/727,341, filed Sep. 26, 1996, now U.S. Pat. No. 5,677,390, issued Oct. 14, 1997.

TECHNICAL FIELD

This invention relates to novel, high quality brominated polystyrenes which are especially suitable for use as flame retardants in thermoplastic formulations.

BACKGROUND

Brominated polystyrenes are well established as flame retardants for use in thermoplastics, e.g., polybutylene terephthalate, polyethylene terephthalate and polyamides. Recently, interest has been shown for expanding their use to syndiotactic polystyrene and polycyclohexylene dimethylene terephthalate. Generally, brominated polystyrenes are produced by a reaction between polystyrene and a brominating agent (e.g., bromine or bromine chloride) in the presence of a solvent (e.g., dichloroethane) and a Lewis acid catalyst. Within this broad context, the prior art has developed several processes which strive to obtain a low cost but high performing brominated polystyrene. Low cost is self-explanatory. Performance is predicated in part upon having a suitable bromine content (60–67 wt % generally being preferred), a solution color ($\Delta E$=20–35) and a chlorine content (the maximum being 1.5 wt %). The process chosen will determine the particular brominated polystyrene produced and thus, its qualities.

The bromine and chlorine content, and the color (it is believed) are properties of the structure of the particular brominated polystyrene being considered. The bromine content applies to the sum of (1) the bromine which is substituted onto the aromatic portions of the polymer, (2) the bromine which is substituted onto the alkyl portion of the polymer, e.g., the polymer backbone or which is present due to alkylation of the aromatic portion of the polymer, and (3) any ionic bromine present, e.g., sodium bromide. The undesired alkylation reaction which occurs during the bromination of polystyrene is catalyzed by the Lewis acid bromination catalyst used, and the reaction solvent (usually a 1–3 carbon atom dihaloalkane) serves as the alkylating agent. The bromine for (1) is referred to herein as aromatic bromide, while the bromine for (2) is referred to as alkyl bromide. Even though ionic bromine (hereinafter ionic bromide) can contribute to the bromine content, its contribution is almost always small to insignificant. Ionic bromide is not part of the polymer structure and is usually washed almost entirely from the brominated polymer product before the bromine content is measured.

The color of the brominated polystyrene is also believed to be due to polymer structure and not the result of some discreet impurity. Color may be caused by the above-mentioned alkyl bromide and/or the below-mentioned alkyl chloride substituents on the aromatic moieties.

The chlorine content is credited to chlorine which, like the bromine, is part of the polymer structure as an aromatic and/or an alkyl chloride. The use of bromine chloride as the brominating agent is the largest contributor to the chlorine content.

As a universal proposition, it is preferred that the brominated polystyrene have a minimized alkyl bromide and/or alkyl chloride, i e., alkyl halide, content. Alkyl halides are not desirable as they are not as thermally stable as are aromatic halides and, thus, they can be easily converted to hydrogen halide, e.g., HBr or HCl, under normal end-use processing conditions. Hydrogen halide, in the presence of moisture, can cause severe corroding of metal process equipment. Also, there is the matter of color, which is also believed to be impacted by some alkyl halides. A brominated polystyrene having almost all aromatic bromide (arbromine) will have desirable flame retarding characteristics as the bromine will not leave the aromatic moiety at processing temperatures, but rather, will leave at the very high temperatures which are encountered in the vicinity of an approaching flame front.

Outside of whether or not the halide is present as an aromatic or an alkyl halide, it is also desirable to minimize the total chlorine content of the brominated polystyrene as chlorine is not as efficacious or as stable a flame retardant constituent as is bromine.

The desirability of obtaining a high aromatic bromine content along with a low alkyl halide and total chlorine content is, unfortunately, not matched by the ability of prior art processes to produce same. Even though the art has proffered many processes which are claimed to produce a superior brominated polystyrene, none have actually been shown to deliver on their promise. See U.S. Pat. No. 4,200,703; U.S. Pat. No. 4,352,909; U.S. Pat. No. 4,975,496 and U.S. Pat. No. 5,532,322. A review of the Examples in these patents, which are reported to be actual experiments, shows that a high bromine content, say 68 wt % or above, is not obtained.

Further, the prior art brominated polystyrenes do not exhibit high thermal stability. Prior art polymers exhibit a 1% weight loss at temperatures less than 336° C. when submitted to Thermo-gravimetric Analysis (TGA) and, indeed, most exhibit a 1% weight loss at temperatures around 300° C. A low thermal stability is not desired when the brominated polystyrene is formulated with thermoplastic formulations which will be exposed to high processing temperatures.

Additionally, it has been demonstrated that prior art processes for the manufacture of brominated polystyrene give rise to significant cleavage of the polymer chain. This cleavage results in the produced brominated polystyrene having an $M_w$, as measured by Gel Permeation Chromatography, which is significantly lower than the calculated theoretical $M_w$ of the brominated polystyrene. The calculation is based upon the bromine content (wt %) of the brominated polystyrene product and the $M_w$ of the polystyrene reactant at reaction initiation. It is advantageous if the theoretical $M_w$ and actual $M_w$ of the produced brominated polystyrene are close, given the ±margins of error for GPC, since such closeness evidences a paucity of polymer cleavage. The degree of cleavage should be minimized since cleavage results in an increase of alkyl end groups in the brominated polystyrene, which alkyl end groups provide loci for the facile formation of the undesirable alkyl halides discussed above.

Commonly-owned co-pending application Ser. No. 08/852,462 and its parent application Ser. No. 08/727,341, filed Sep. 26, 1996, now U.S. Pat. No. 5,677,390, both referred to at the outset, provide and describe, inter alia, novel thermally stable brominated polystyrene, and novel process technology for producing such brominated polystyrenes.

BRIEF SUMMARY OF THE INVENTION

It has now been found possible to still further increase the thermal stability of brominated polystyrene to such an extent that even the exposure of a preferred brominated polystyrene composition of this invention to temperatures as high as 315° C. for one hour does not result in significant darkening of the color of the resin. Moreover, while this invention makes it possible to further increase the thermal stability of the brominated polystyrenes disclosed in the above-referred-to commonly-owned co-pending application Ser. No. 08/852,462, it is believed that it is now possible by use of this invention to increase the thermal stability of other brominated polystyrenes, such as for example the Pyro-Chek® brominated polystyrene flame retardant manufactured and marketed by Ferro Corporation, as well as any other brominated polystyrene flame retardant resin produced by bromination of a pre-existing polystyrene oligomer or polymer. For convenience, the term "brominated polystyrene" as used in the specification and in the claims hereof refers to a brominated polystyrenic flame retardant resin produced by bromination of a pre-existing polystyrenic oligomer or polymer, as distinguished from an oligomer or polymer produced by oligomerization or polymerization of one or more brominated styrenic monomers, the properties of the latter oligomers or polymers being considerably different from brominated polystyrene in a number of respects.

Another striking feature of this invention is the finding that a substantial increase in the thermal stability of brominated polystyrene flame retardant can be achieved by the inclusion in the oligomer or polymer of very small amounts of an ingredient not known as a thermal stabilizer for brominated polystyrene. Indeed, the amount of the component in most cases can be so small (e.g., below 0.75 wt %, and preferably below 0.5 wt %) as to result in virtually no change in the physical properties of a finished polymer composition (e.g., polyester, polyamide, polyolefin, polyether, polyesteramide, polycarbonate, polysulfone, or other thermoplastic material) with which the brominated polystyrene of this invention has been blended in a flame retarding amount, as compared to the same finished polymer composition made with the same amount of the same brominated polystyrene flame retardant except that it does not contain the special thermal stabilizer component of this invention.

Thus in one of its embodiments this invention provides a brominated polystyrene flame retardant additive composition which contains alkali metal base in an amount less than about 1 wt % (preferably, less than about 0.5 wt %) such that if the flame retardant additive is dissolved in bromochloromethane and the resultant solution is extracted with water, the resultant water extract exhibits a pH of at least about 9.0. The actual chemical structure or composition of the alkali metal base may be changed or altered when incorporated into the brominated polystyrene, and therefore when referring to the alkali metal base contained or present in the brominated polystyrene (as distinguished from the alkali metal base before use), the term "alkali metal base" is to be understood as referring to the basic substance resulting from the inclusion of at least one specified basic alkali metal compound into the brominated polystyrene regardless of whether the initial alkali metal compound remains intact or is partially or totally transformed into one or more other chemical forms by virtue of its incorporation into the brominated polystyrene. In preferred embodiments the brominated polystyrene flame retardants in accordance with this invention, the alkali metal base is residual base resulting from addition of a sodium or potassium inorganic base, most preferably sodium hydroxide, sodium oxide, potassium hydroxide, potassium oxide, or a mixture of any two or more of these bases, to the brominated polystyrene during its production. Particularly preferred flame retardants of this invention are produced in particulate form by precipitation from a solution of brominated polystyrene, and where a basic inorganic alkali metal compound is incorporated into the brominated polystyrene by performing the precipitation in contact with a solution of the such compound. As used in the specification and in the claims hereof, the term "particulate" means that the brominated polystyrene is in the form of separate particles which can be finely divided as in a powder, and/or in the form of larger particles such as granules, flakes, chips, grains or pellets.

The brominated polystyrenes of this invention typically contain in the range of about 65 to about 70 wt % bromine. Surprisingly, the contacting of such highly brominated substrates with, and the inclusion in such highly brominated substrates of, a basic inorganic alkali metal compound in the proportions utilized pursuant to this invention do not appear to cause any appreciable dehydrobromination of such brominated polystyrenes.

A first preferred embodiment is brominated polystyrene which contains less than about 500 ppm Cl, and more preferably 100 ppm Cl, which has a TGA temperature for 1% weight loss which is 340° C. or higher, and which contains alkali metal base in an amount of less than about 1 wt % (preferably less than about 0.5 wt %) such that if the brominated polystyrene is dissolved in bromochloromethane and the resultant solution is extracted with water, the resultant water extract exhibits a pH of at least about 9.0. It is desirable in this embodiment to utilize brominated polystyrene having a TGA 1% weight loss at a temperature within the range of from about 340° C. to about 380° C. and, more desirably, within the range of from about 345° C. to about 375° C.

A second preferred embodiment is brominated polystyrene (i) which has an actual $M_w$ that is within about 20% of its calculated theoretical $M_w$, the theoretical $M_w$ being based upon (a) the actual bromine content of the brominated polystyrene and (b) the $M_w$ of the polystyrene reactant used to produce the brominated polystyrene, and (ii) which contains alkali metal base in an amount such that if the brominated polystyrene is dissolved in bromochloromethane and the resultant solution is extracted with water, the resultant water extract exhibits a pH of at least about 9.0.

A third preferred embodiment is brominated polystyrene comprised of polymer units having the formula:

wherein each X is independently a hydrogen atom or a bromine atom or a chlorine atom, the identity of each X for each polymer unit being such that the brominated polystyrene evolves less than 750 ppm of hydrogen halide(s), and desirably, less than about 500 ppm of hydrogen halide(s) when heated at 300° C. for 15 minutes at ambient atmospheric pressure; wherein the brominated polystyrene contains at least about 65 wt % bromine, and more preferably at least about 67 wt % bromine; wherein the total chlorine content, if any, of the brominated polystyrene is no more than about 500 ppm, and more preferably no more than about 100 ppm; and wherein the brominated polystyrene contains alkali metal base in an amount less than about 1 wt % (preferably less than about 0.5 wt %) such that if the brominated polystyrene is dissolved in bromochloromethane and the resultant solution is extracted with water, the resultant water extract exhibits a pH of at least about 9.0. (All ppm values used herein are by weight and are based upon the total weight of the brominated polystyrene unless otherwise indicated.) Most preferably the brominated polystyrene of this third embodiment is a brominated polystyrene that was prepared by brominating polystyrene in a bromochloromethane solvent.

A fourth preferred embodiment is brominated polystyrene which has a TGA temperature for 1% weight loss which is 340° C. or higher, and which contains alkali metal base in an amount less than about 1 wt % (preferably less than about 0.5 wt %) such that if the brominated polystyrene is dissolved in bromochloromethane and the resultant solution is extracted with water, the resultant water extract exhibits a pH of at least about 9.0.

A fifth preferred embodiment is brominated polystyrene which is free or essentially free of impurities selected from the group consisting of bromodichloroethane, dibromochloroethane, dibromodichloroethane, tribromochloroethane and any mixture of two or more of the foregoing, and which contains alkali metal base in an amount less than about 1 wt % (preferably less than about 0.5 wt %) such that if the brominated polystyrene is dissolved in bromochloromethane and the resultant solution is extracted with water, the resultant water extract exhibits a pH of at least about 9.0.

Particularly preferred embodiments include brominated polystyrenes having combinations of the properties and attributes of any two, any three, or all four of the above first, second, third, and fifth preferred embodiments, or of the above second, third, fourth, and fifth preferred embodiments. Presently, even more preferred embodiments of this invention are (i) the brominated polystyrenes of any the above of first through fifth preferred embodiments individually, or (ii) any of the brominated polystyrenes having the properties and attributes of the brominated polystyrenes of the particularly preferred embodiments referred to in the immediately preceding sentence, wherein (a) the base employed in forming such composition is one or more alkali metal hydroxides or alkali metal oxides (especially a hydroxide or oxide of Na or K) employed as an aqueous solution formed by dissolving such base in an aqueous medium, such as water, and (b) the content of the resultant alkali metal base in the brominated polystyrene composition is no more than 0.25 wt %, and better yet, is no more than 0.15 wt %. Such extremely low concentrations of such alkali metal base in the brominated polystyrene composition ensures that neither (1) the brominated polystyrene composition itself nor (2) a polyolefin polymer, a polyester polymer, or a polyamide polymer in which the brominated polystyrene composition has been blended in an amount of up to 25 wt % as a flame retardant, will suffer any appreciable degradation of properties during normal processing and storage due to the presence of the alkali metal base.

A further embodiment of this invention is a process which comprises:

a) contacting (i) a solution of brominated polystyrene in an organic solvent that boils at a temperature in the range of at least about 35° C. and below about 150° C. and (ii) water in the presence of alkali metal base to form a mixture;

b) contacting the mixture of a) with an amount of steam or water which is at a temperature high enough such that at least a portion of said organic solvent distills off and particles of brominated polystyrene containing alkali metal base are formed;

with the proviso that the amount of alkali metal base in said particles of brominated polystyrene is less than about 1 wt % and is such that if the brominated polystyrene is dissolved in bromochloromethane and the resultant solution is extracted with water, the resultant water extract exhibits a pH of at least about 9.0. In part a) of this embodiment the alkali metal base that is present as the mixture is being formed may come to the mixture in a variety of ways. Thus (i) the alkali metal base may be carried into the mixture being formed in a) along with the brominated polystyrene, or (ii) the alkali metal base may be present in the water as an aqueous solution being contacted with the brominated polystyrene, or (iii) the alkali metal base may be added separately to the mixture being formed in a), or (iv) the alkali metal base may be present through a combination of any two or all three of routes (i), (ii), and (iii). The important thing is that it is present irrespective of how it arrived there, and irrespective of whether it arrived in ionized or non-ionized form.

The above and other embodiments and features of this invention will become still further apparent from the ensuing description and appended claims.

FURTHER DETAILED DESCRIPTION

Polystyrene Reactant

The polystyrene reactant used in the production of the brominated polymers of this invention can be any of those which are commercially available. Generally, the polystyrene backbone will not have been hydrogenated and, thus, will have unsaturation. There is no need for the brominated polymers to be produced from anionically produced polystyrene as is taught in EPO 0 201 411; in fact, it is preferred that the polystyrene reactant not be an anionically produced polystyrene as such polymers are expensive and not readily available. The aromatic pendant constituents of the polymer can be alkyl substituted, but in most cases, will not be so substituted. Preferred polystyrenes used to produce the brominated polystyrenes of this invention will have a $M_w$ within the range of from about 500 to about 500,000 and a polydispersity within the range of from above about 1 to about 4. For most purposes, the polystyrene reactant will have a $M_w$ within the range of from about 100,000 to about 300,000 and will have a polydispersity within the range of from about 1.25 to about 2.5. The lower molecular weight polystyrene reactants will have a $M_w$ within the range of from about 500 to about 100,000 and a polydispersity less than about 10 and preferably within the range of from above 1 to about 4. Suitable higher molecular weight polymers have a $M_w$ within the range of from about 300,000 to about 500,000 and a polydispersity within the range of from above 1 to about 4. The $M_w$ and polydispersity values are both based on gel permeation chromatography (GPC) techniques which are hereinafter described.

It has also been found preferable that the original polystyrene used in the formation of the brominated polystyrenes not contain any additives, such as zinc stearate, paraffins, mineral oils and the like. A highly preferred polystyrene is Styron® 612 which is marketed by Dow Chemical Company of Midland, Mich. However, additive-containing polystyrene such as Styron 668, Styron 677, Styron 680 of Dow Chemical Company, as well as Piccolastic A5, Piccolastic A75, or Piccolastic D125 of Hercules Incorporated of Wilmington, Del., or equivalent materials from other producers, can be used.

Brominated Polystyrene

However prepared, the brominated polystyrene should contain at least about 60 wt % bromine, although brominated polystyrenes with even lower bromine contents (e.g., as low as 55 wt %) may be improved in thermal stability by the practice of this invention. Typically the bromine content will be in the range of about 65 to about 70 wt %. Better flame retardancy performance is achieved from brominated polystyrenes having a content of at least about 67 wt % bromine. Preferably, the brominated polystyrene has a bromine content of at least about 68 wt %.

While any brominated polystyrene should benefit in thermal stability by the practice of this invention, the preferred brominated polystyrenes used in forming the compositions of this invention possess good color to begin with. For flame retardants, color is an important property, with pure white being the ultimate goal. Due to the formation of various color bodies by all bromination processes, the industry has accepted near-white products as being acceptable. The color of prior art brominated polystyrene, expressed as a solution ΔE value, generally will fall within the range of 20 to 35. In distinction, the preferred brominated polystyrenes used in the practice of this invention feature ΔE values of less than 20 and preferably within the range of from about 5 to about 18. Most preferably, the ΔE value will be within the range of from about 5 to about 15.

Another physical property of the preferred brominated polystyrenes used in the practice of this invention is that they have essentially no or very little odor when heated to a temperature above 150° C. In comparison, Pyro-Chek brominated polystyrene flame retardant of Ferro Corporation has a noticeable and strong odor at 150° C. The strong odor is believed to be attributable to the presence of bromochloroethanes, e.g., bromodichloroethane, dibromochloroethane, dibromodichloroethane and tribromochloroethane, which are in the Pyro-Chek 68PB product. Such bromochloroethanes are not seen in detectable quantities in the preferred brominated polystyrenes formed and utilized in the practice of this invention.

Among highly desirable brominated polystyrenes for use in the practice of this invention are:

a) brominated polystyrene which evolves less than 750 ppm, and desirably less than 500 ppm of HBr when heated at 300° C. for 15 minutes at ambient atmospheric pressure;

b) brominated polystyrene of a) which, in addition, contains less than about 500 ppm total chlorine (Cl), and more preferably, less than about 100 ppm total chlorine (Cl);

c) a brominated polystyrene which, in addition to meeting the requirements of a) or b), has an actual $M_w$ which is close to its calculated theoretical $m_w$, the theoretical $M_w$ being based upon (i) the actual bromine content of the brominated polystyrene and (ii) the $M_w$ of the polystyrene reactant used to produce the brominated polystyrene; and d) a brominated polystyrene which, in addition to meeting the requirements of a) or b) or c), has a total bromine content in the range of about 67 to about 70 wt %.

The brominated polystyrenes may contain some chlorine (Cl), but the amount will be insignificant, say, less than about 500 ppm (Cl), and preferably less than about 100 ppm (Cl). If chlorine is present, its source would probably be the Lewis acid catalyst or the solvent used in the preparation of the brominated polystyrene, and possibly traces of the residual chlorine-containing solvent used. Most preferred brominated polystyrenes are those in which the chlorine content is not detectable using X-Ray Fluorescence analysis.

It is desirable that the brominated polystyrene have an actual $M_w$ which is within about 20% of its calculated theoretical $M_w$, the theoretical $M_w$ being based upon the actual bromine content of the brominated polystyrene and the $M_w$ of the polystyrene reactant used to produce the brominated polystyrene. A difference between the actual $M_w$ and the theoretical $M_w$, outside of the normal±margin of error for GPC analysis, is evidence of either cross-linking (increases the $M_w$) or polymer chain cleavage (decreases the $M_w$). The foregoing 20% difference for such brominated polystyrenes includes the ±margin of error. Preferred differences are those less than about 20%, with differences of less than about 10% being most preferred. Since GPC techniques can give different but similar values for the same polymer tested, defining a brominated polystyrene as meeting the 20% or 10% criteria described above, is best performed by taking the arithmetic average of five consecutive GPC determinations of the brominated polystyrene polymer to be tested. Other data averaging techniques are suitable, such as using the average of 10 consecutive GPC determinations with discard of the high and low values. Naturally, the specific GPC procedure used should provide accurate and reproducible results.

Bases Used to Achieve Enhanced Thermal Stability

The base used in providing the increased thermal stability pursuant to this invention originally is one or more basic alkali metal compounds, desirably one or more basic inorganic alkali metal compounds, of which those containing sodium and/or potassium are especially desirable. Preferably the base used is originally one or more alkali metal hydroxides (especially sodium hydroxide or potassium hydroxide or a combination of these), alkali metal oxide (especially sodium oxide or potassium oxide or a combination of these), or a combination of one or more alkali metal hydroxides and one or more alkali metal oxides (especially a combination of sodium hydroxide and sodium oxide, or of potassium hydroxide and potassium oxide, of sodium hydroxide and potassium oxide, or of potassium hydroxide and sodium oxide). Other illustrative alkali metal bases include sodium carbonate, potassium carbonate, lithium hydroxide, sodium acetate, sodium acetylacetonate, potassium octylacetoacetate, cesium hydroxide, disodium hydrogen phosphate, trisodium phosphate, sodium tetraborate, sodium sulfite, and other salts or alkali metal chelates.

As regards composition of the base, the material is identified herein as to its composition prior to being combined with any other substance being used in forming the flame retardant compositions of this invention. After addition to, and/or mixing with, one or more other components used in the process of making the flame retardant and/or during the course of the process of making the flame retardant, the base may change in its composition, and if so, the resultant changed material, whatever its makeup and however many changes it may undergo, if present in the finished flame retardant in a suitable amount, is deemed responsible in whole or in part for the functioning of the alkali metal base as a thermal stabilizer. For example, as described hereinafter, a basic compound such as sodium hydroxide may be, and preferably is, used as an aqueous solution. Such solution can be formed by mixing sodium hydroxide with water, and in addition, it may be formed in situ by mixing sodium oxide with water to form a solution of sodium hydroxide. In either case the sodium hydroxide is ionized in the water and thus technically may no longer be sodium hydroxide as such. But whatever form it is in, it has the property of serving as a thermal stabilizer in the finished brominated polystyrene flame retardant composition. Thus by "originally" is meant that the base is referred to herein as if it is in its original molecular structure before use in forming the compositions of this invention or a solution or other mixture used in forming such compositions, even though the base may have been converted in whole or in part in the processing used in forming the flame retardant composition of this invention to some other molecular form or composition.

Formulation of the Base into Brominated Polystyrene

It may be possible to simply blend a thermal stabilizing quantity (e.g., less than 1 wt % and preferably less than 0.5 wt % of the total weight of the composition) of the base into a preformed brominated polystyrene. This may be accomplished by blending the base into the molten brominated polystyrene with sufficient mixing to ensure reasonably substantially uniform distribution of the base in the resin. Another way by which such compositions may be formed is powder blending wherein a preformed brominated polystyrene in finely-divided form such as a powder, and the base also in finely-divided form such as a powder are mixed together to form a powder blend wherein the composition of the blend is at least substantially uniform if not uniform throughout. As noted above, the amount of base introduced into or mixed with the brominated polystyrene is such that if the resultant composition is dissolved in bromochloromethane and the resultant solution is extracted with water, the resultant water extract exhibits a pH of at least about 9.0. The pH measurements are made using a standard pH meter such as a Hach EC-10 meter (Hach Company, Loveland, Colo.), or equivalent pH meter. It has been found that at least one type of strips for measuring pH did not give reliable measurements.

To date however, it appears definitely preferable to incorporate the base into the brominated polystyrene at the time the brominated polystyrene is being precipitated from solution in particulate form. Brominated polystyrene compositions produced in this manner appear to possess the best thermal stability. In such preferred procedure, an aqueous solution of an inorganic alkali metal base such as a 10 wt % solution of NaOH and/or KOH in water is brought into contact with a solution of the brominated polystyrene in a suitable organic solvent, such as methylene chloride, ethylene dichloride, 1,1,1 -trichlorethane, trichloroethylene, and similar halohydrocarbons that boil somewhere in the range of at least about 35° C. and below about 150° C. Of these, methylene chloride and ethylene dichloride are generally more desirable than the others just named, as methylene chloride and ethylene dichloride are useful as solvents in which the polystyrene can be brominated. However, a particularly preferred organic solvent for the brominated polystyrene is bromochloromethane. Not only is bromochloromethane an excellent solvent for brominated polystyrene, but it is an ideal medium in which the polystyrene can be brominated as it is environmentally friendly, it is relatively inert in the bromination process, it has a very desirable boiling point of 68° C, and when the bromination process is suitably conducted in this solvent, a near-white brominated polystyrene product can be formed. Commnonly-owned copending application Ser. No. 08/846,156 filed Apr. 25, 1997 describes and claims a process for producing brominated polystyrene in which bromochloromethane is used as the reaction medium.

In conducting a preferred process for formulating the compositions of this invention, the solution of the base in a suitable solvent and a solution of the brominated polystyrene in a suitable solvent are introduced into a hot liquid aqueous medium and/or steam to cause at least a portion of the organic solvent to distill off from the mixture and to cause the brominated polystyrene to be precipitated in particulate form. During this operation, and when the base is in an aqueous solution, the contacting solutions can be stirred or otherwise agitated to ensure intimate contact between them. It can be seen, therefore, that at the same time the brominated polystyrene particles are being formed, the base is being incorporated into the forming particles. This results in the formation of a composition of this invention provided that the resultant particulate brominated polystyrene contains an amount of alkali metal base such that if the particulate brominated polystyrene flame retardant is dissolved in bromochioromethane at 25° C. and the resultant solution is extracted with water at 25° C., the resultant water extract exhibits a pH of at least about 9.0.

Production of Preferred Brominated Polystyrene Compositions of This Invention

The preferred brominated polystyrenes made and used in the practice of this invention are not conventionally produced. Generally, a suitable process comprises feeding a mixture of bromine and a solution of bromochloromethane and polystyrene (2.5 to 5 moles of bromine per mole of polymerized styrene in the polystyrene) to a reactor containing a further amount of bromochloromethane and a catalytic amount of $AlCl_3$. [The mixture of polystyrene, bromochloromethane and bromine is substantially free of a bromination catalyst. The phrase, "substantially free of a bromination catalyst," is to be taken to mean less than a catalytically effective amount of catalyst. With such low amounts of catalyst, little or no catalyzed bromination or cross-linking should occur. Generally, such amounts will be less than 500 ppm based on the weight of polystyrene reactant present.] The reaction temperature will be within the range of from about −10° C. to about 10° C. Preferably, the reaction is conducted at one or more temperatures in the range of about −10° C. to about 0° C. as this provides product of the highest quality and, surprisingly, the reaction itself proceeds at a suitably rapid rate at these low temperatures such that the process meets commercial production requirements. After the reaction mass is formed, it is usually maintained at reaction temperature for a period in the range of about 5 minutes to 2 hours, and preferably in the range of about 5 minutes to about 20 minutes. After this period, the reaction product is worked up by adding sodium sulfite, sodium gluconate and sodium hydroxide or other base to deactivate the catalyst, kill any remaining brominating agent and to adjust the reaction mass pH to a suitable level of basicity. After these treatments, the reaction mass is settled to obtain a two-phase reaction mass containing an organic phase, which contains, as a solute, the brominated styrenic polymer product and an aqueous phase. The aqueous phase is decanted and the remaining organic phase is stripped of its solvent component. It is most convenient to accomplish this strip by pouring the organic phase into boiling water. As the solvent is flashed off, the brominated styrenic polymer product forms a precipitate containing a thermal stabilizing amount of base—i.e., an amount of alkali metal base in the finished brominated polystyrene composition such that if a sample of the finished composition is dissolved in bromochloromethane and the resultant solution is extracted with water, the aqueous extract has a pH of at least about 9.0, preferably a pH in the range of about 9.5 to about 11, and more preferably in the range of about 10 to about 10.5. The precipitate can be recovered by any liquid-solid separation technique, e.g., filtration, centrifugation, etc. The recovered precipitate is then dried.

In the production of brominated polystyrene, it is important that the iron content be kept to a minimum, say less than about 10 ppm iron. The introduction of iron into the product usually occurs due to iron equipment which is in contact with the reaction and product streams. Thus, it is preferred to use process equipment which does not act as a source of iron contamination. For example, the equipment can be glass-lined or corrosion resistant alloy.

Figure 1:
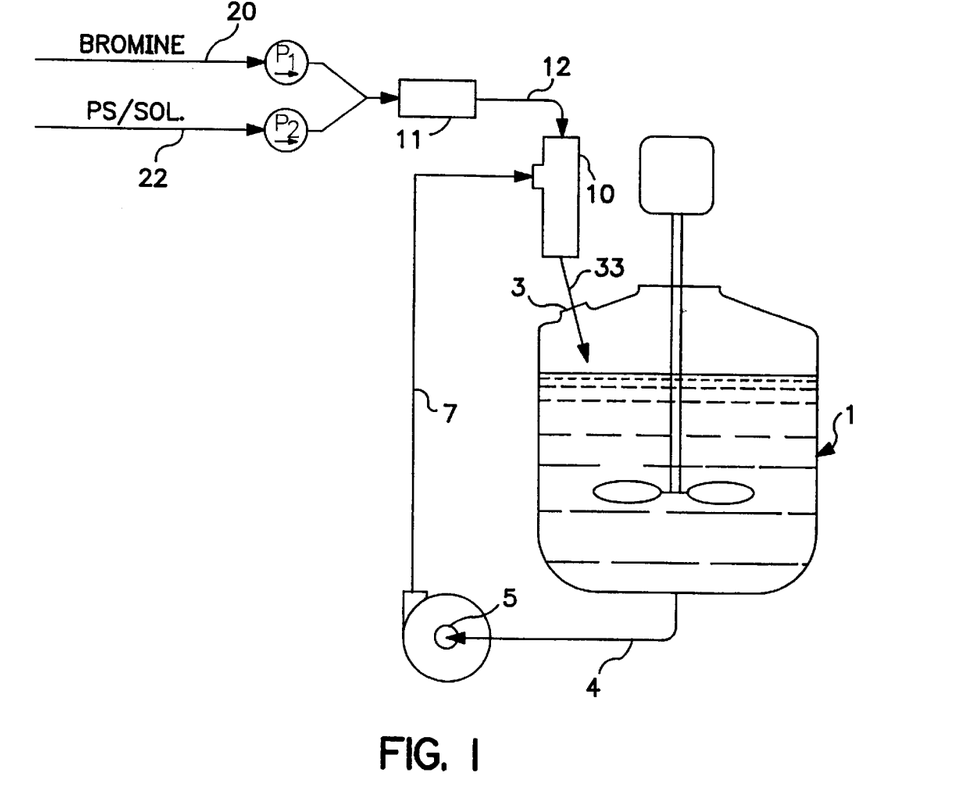
FIG. 1 is a schematic diagram depicting a process suitable for producing preferred brominated polystyrene compositions of this invention.

A more detailed process description with reference to the accompanying drawing is given below.

Detailed Description of Bromination Process with Reference to the Drawing

Preferred process technology for producing brominated polystyrenes is described herein. It will be appreciated that, unless otherwise indicated in the specification hereof or specified in any claim hereof, this invention is not limited to use of all or any part of this preferred process technology.

Polystyrenes useful for the production of the brominated polystyrenes by this preferred process are any of those which have been described above. Also, as mentioned previously, it is preferred that the polystyrene be additive-free. Again, a most preferred polystyrene reactant is Styron 612 which is marketed by Dow Chemical Company.

The catalyst used in the preferred process can be any of the aluminum based catalysts, e.g., $AlCl_3$, $AlBr_3$ and Al. Mixtures of aluminum catalysts can also be used. Once the catalyst has been added to the reaction system, it may undergo some reaction without significant loss of catalytic activity, e.g., $AlCl_3$ may convert to some extent to $AlBr_3$. $AlCl_3$, because of its availability and price, is the catalyst of choice.

The catalyst is used in an amount which is sufficient to obtain the catalytic effect sought. These catalytic amounts will depend on the activity of the catalyst, but will generally fall within the range of from about 0.2 to about 5 weight percent and preferably within the range of from about 0.5 to about 5 weight percent, based on the weight of the styrenic polymer being brominated. The most active catalysts will be used in the lower amounts, while the less active catalysts will be used in the higher amounts. When $AlCl_3$ is the catalyst, amounts within the range of from about 0.5 to about 3 weight percent are preferred.

The brominating agent is preferably bromine. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed which will provide from 1 to 3 bromine substitutions per styrenic monomer unit in the polymer. It is preferred that the brominated polystyrene contain at least about 67 wt % bromine, and desirably at least about 68 wt % bromine and most preferably within the range of from about 69 to 71 wt % bromine. For any particular styrenic polymer, the amount of brominating agent used in the process will be determined by the bromine content desired considering the highest bromine content which is obtainable with the process parameters chosen. The higher bromine contents will require the most brominating agent. It is pointed out that as perbromination is approached, it becomes more difficult to substitute the last bromines. Adding ever larger amounts of a brominating agent does not always attenuate this difficulty. However, it is helpfiul, in attempting to maximize the bromine content, to provide a small stoichiometric excess of brominating agent. Stoichiometric excesses up to about 10% are preferred. The stoichiometry is easily determined as it requires one mole of $Br_2$ per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine per styrenic monomer unit will be required, not including any desired stoichiometric excess.

All of the bromine can be added with the polystyrene-bromochloromethane solution or a portion of the bromine can be pre-added to the reactor with the remainder being added with the solution. If pre-addition is to be used then the pre-added portion will amount to 0.5 to 20% of the total bromine used in the process.

While the foregoing describes the overall quantitative relationship between the brominating agent and styrenic polymer, the quantitative relationship between these two reactants in the feed mixture has not been fully discussed. Generally, the mixture which is to be fed is formed from about 1 to about 8 moles of brominating agent per mole of styrenic monomer units at any time during the feed period. During the feed, the quantitative relationship can be constant or can vary within the above-mentioned range. (It is possible to allow for some excursions outside of the range so long as such does not do significant harm to the process efficiency or to product quality.) A preferred range is from about 2.5 to about 5 moles of brominating agent per mole of styrenic monomer units to form the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units will result in exhaustion of either the brominating agent or the styrenic polymer as a mixture constituent before exhaustion of the other constituent. For example, if the practitioner chooses to produce brominated polystyrene with a 70 wt % bromine content, an overall molar ratio of bromine to styrenic monomer units of 3.0:1, and any excess if desired, would be suitable. If the practitioner chooses to form a feed mixture in which the molar ratio of bromine to styrenic monomer units is 1:1, it can be seen that the amount of polystyrene to be fed will be completed before obtaining the needed overall amount of bromine. In this case, the practitioner first uses the 1:1 mixture and then continues on with just a bromine feed after the polystyrene feed has been exhausted. If, on the other hand, the molar ratio in the feed mixture is chosen to be 5:1, then the bromine will first become exhausted and the feed will have to be finished with the polystyrene alone. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the process be essentially anhydrous, i.e., contain less than 100 ppm (weight basis) water and contain no more than 10 ppm organic impurities, e.g., oil, grease, carbonyl containing hydrocarbons, iron, and the like. Available, commercial grade bromine may have such purity. If, however, such is not available, the organic impurities and water content of the bromine can be conveniently reduced by mixing together a 3 to 1 volume ratio of bromine and concentrated (94–98 percent) sulfuric acid. A two-phase mix is formed which is stirred for 10–16 hours. After stirring and settling, the sulfuric acid phase, along with the impurities and water, is separated from the bromine phase. To further enhance the purity of the bromine, the recovered bromine phase can be subjected to distillation.

The preferred organic solvent for the bromination, namely, bromochloromethane, is preferably essentially anhydrous, containing less than 100 ppm (weight basis) water. It is most preferred that the solvent contain as little water as is practically obtainable, say between 10 to 30 ppm (weight basis).

The process benefits from the reaction mass being in an anhydrous condition. Water tends to affect the catalytic activity of the aluminum catalyst, which effect may hinder the quick aromatic bromination of the styrene rings. If, for some reason, the practitioner has large amounts of water in the process and dewatering is not practical, then it may be possible to overcome the situation by simply increasing the amount of catalyst used.

By forming a solution of bromochloromethane and styrenic polymer, the polymer becomes easy to handle and mix with bromine. These solutions preferably contain from about 5 to about 50 wt % polymer. More highly preferred are those which contain from about 5 to about 30 wt % polymer.

It is preferred to have the bromination catalyst, to which the bromine/styrenic polymer mixture is fed, to be in association with bromochloromethane so that the catalyst can be in a solution, slurry, dispersion or suspension. Such will enhance reaction mass mixing and mass transfer qualities. The mixture of bromochloromethane and catalyst is best described as a suspension. Generally, it is suitable to use from about 95 to about 99.9 wt %, preferably from about 99 to about 99.8 wt %, bromochloromethane, based on the total weight of bromochloromethane and catalyst.

The styrenic polymer/brominating agent mixture feed should occur expeditiously, with consideration being given to the ability of the process equipment to handle the heat load from the exothermic process, the evolving HBr, and other process concerns. In short, the feed can occur over the shortest time period that will be allowed by the equipment without excursion outside of critical process parameters. Generally, it is anticipated that the feed period will be from 0.5 to 3 hours for a commercial-size plant. Shorter feed periods are expected for smaller scale processes.

It is possible to conduct the bromination reaction at a temperature within the range of from about −20° C. to about 60° C. Desirably, the bromination temperature is maintained within the range of from about −10° C. to about 10° C. Most preferred temperatures are in the range of from about −10° C. to about 0° C. As noted above, this last-mentioned temperature range provides product of the highest quality and, surprisingly, the reaction itself proceeds at a suitably rapid rate at these low temperatures such that the process meets commercial production requirements. The pressure can be atmospheric, subatmospheric or superatmospheric.

In carrying out the process, a bromination catalyst, say $AlCl_3$, is suspended in essentially anhydrous bromochloromethane, to give an easily stirrable suspension. The suspension is prepared in a glass-lined, stirred reactor and brought to a temperature within the range of from about −10° C. to about −5° C. The mix is kept under an inert, dry atmosphere in the reactor. A solution of a styrenic polymer and bromochloromethane is prepared and intimately mixed with a bromine stream to yield a homogenous mixture. The mixture is fed into the stirred bromination catalyst suspension in the reactor. The intimate mixing of the styrenic polymer solution and bromine can be accomplished in a number of ways. For example, the solution and bromine can be fed to a mixing device, e.g., a mixing nozzle, at the lower end of the diptube in the reactor which extends to a point below the suspension level. The mixing device is designed to obtain the intimate mixing of the solution and bromine. Also, the mixing device acts to impart mixing energy, at the point of feed, to the intimate mixture and catalyst suspension. Another technique for obtaining intimate mixing of the styrenic polymer solution and brominating agent, is to use an exterior reactor loop having an in-line mixer, such as an impingement mixer. Generally, the use of an exterior reactor loop includes first charging the reactor with a bromination catalyst slurry, suspension, etc., and then withdrawing from the reactor a stream which is then fed to a mixer external of the reactor. A mixture formed from at least bromine and styrenic polymer is also fed to the mixer to yield a second mixture which is formed from the two feeds to the mixer. The second mixture is subsequently fed back to the reactor. The stream withdrawn from the reactor will initially comprise the catalyst. After the second mixture is fed to the reactor and the process runs, the withdrawn stream will begin to comprise brominated polystyrene along with catalyst. As the process continues, the degree of bromination of the polystyrene will increase.

Exemplifing the use of an exterior reactor loop, reference is made to FIG. 1 wherein there is shown a reactor, generally designated by the numeral 1. Reactor 1 is a stirred reactor and initially contains a suspension comprising catalyst and bromochloromethane. Reactor discharge conduit 4 provides a stream from reactor 1 which is fed to pump 5. Pump 5 pressurizes the stream so that it is fed with force via conduit 7 to impingement mixer 10. Bromine is fed via conduit 20 to pump $P_1$ while, at the same time, a solution of polystyrene and bromochloromethane is fed via conduit 22 to pump $P_2$. Pumps $P_1$ and $P_2$ feed in-line mixer 11 to obtain an intimate mixture of bromine, polystyrene, and solvent. This intimate mixture is fed to impingement mixer 10, wherein it is intimately mixed with the stream from reactor 1. The discharge from impingement mixer 10 is fed via conduit 33 to reactor 1 through feed port 3. The removal of contents from reactor 1 and their feed to impingement mixer 10 continues to occur until at least substantially all of the bromine and polystyrene/bromochloromethane solution have been fed.

As can be appreciated, the contents of reactor 1 change in composition during the bromine and bromochloromethane solution feeds. Initially, the contents of reactor 1 comprise catalyst and solvent. As the process runs, the reactor contents comprise and begin to become more rich in brominated polystyrene, some of which is underbrominated and some of which is of the degree of bromination sought. During the last stages of the reaction period, the final bromination occurs so as to achieve the level of bromination desired.

Irrespective of whether or not a diptube mixer or an exterior impingement mixer is used, the bromination of styrenic polymer will yield HBr as a major by-product. The HBr formed in the process is usually found in the head space above the reactor contents. It is preferred that the HBr be removed and passed to a water scrubber or stored as dry HBr. A dry, inert gas, e.g., nitrogen, can be used as a pad over the reactor contents to minimize the presence of water therein.

The reactor, in all cases, is preferably kept at a low temperature, e.g., from about −10° C. to about 0° C., during the feed of the styrenic polymer and/or brominating feed, as the case may be, and most preferably from about −10° C. to about −5° C. Also, after the feed is accomplished, the reactor is maintained at reaction temperature (desirably in the range of −10° C. to about 10° C. and preferably in the range of −10° C. to about 0° C.) for a period of from about 5 minutes to about 2 hours and preferably from about 5 to about 20 minutes. Such additional period of time following completion of the feed serves to continue the bromination until the desired degree of bromination has been achieved. Such period will be longer if the reaction parameters provide for mild bromination conditions during the bromine-polystyrene feed than if the parameters chosen provide for more severe bromination conditions during the feed. The reaction mass can be kept in the reactor during the additional period of time following completion of the feed.

When the desired degree of bromination has been achieved, the reaction mass can be treated with water, sodium sulfite, sodium gluconate and sodium hydroxide to deactivate the catalyst, to kill any remaining brominating agent, to adjust the reaction mass pH and, pursuant to this invention, to provide a suitable amount of alkali metal base for incorporation into the brominated polystyrene. After these treatments, the reaction mass is settled to obtain a two-phase reaction mass containing an organic phase, which contains, as a solute, the brominated styrenic polymer product, and an aqueous phase. The aqueous phase is decanted and the remaining organic phase is stripped of its solvent component. It is most convenient to accomplish this strip by pouring the organic phase into boiling or near-boiling water. As the solvent is flashed off, particles of the brominated styrenic polymer product form in and separate from the residual liquid phase as a precipitate, and pursuant to this invention concurrently a suitable amount of the base is incorporated into the particulate brominated polystyrene as it is being formed. To aid in producing an easily recoverable precipitate, it is preferred that a surfactant, such as dioctyl sulfosuccinate sodium salt, be added to the hot water. See Example 4, infra. The amount of dioctyl sulfosuccinate used can be within the range of from about 0.01 to about 0.05 wt %, based upon the total weight of water and surfactant. The precipitate can be recovered by any liquid-solid separation technique, e.g., filtration, centrifugation, etc. The recovered precipitate is then dried.

Use of the Compositions of This Invention as Flame Retardants

When used as flame retardants in thermoplastic formulations or foam applications, the brominated polystyrene compositions of this invention are used in amounts which are within the range of from about 5 to about 20 wt %, the wt % being based on the total weight of the formulation. Thermoplastics such as polyester, polyamide, polyolefin, polyether, polyesteramide, polycarbonate, and polysulfone are typical substrate resins. The thermoplastics which may be most benefited by the subject brominated polystyrene compositions are engineering thermoplastics such as polyethylene terephthalate, polybutylene terephthalate, polycyclohexylene dimethylene terephthalate, polyamide resins, and the like. Conventional additives, such as antimony flame retardant synergist, antioxidants, UV stabilizers, pigments, impact modifiers, fillers, acid scavengers, blowing agents, glass fibers or other reinforcing materials, and the like, can be included with the formulations or foams as is appropriate.

Analytical Methods

It will be recalled that the thermally stable brominated polystyrene compositions of this invention contain alkali metal base (e.g., NaOH or residues thereof) in an amount less than about 1 wt %, such that if the flame retardant is dissolved in bromochloromethane and the resultant solution is extracted with water, the resultant water extract exhibits a pH of at least about 9.0. A useful method for determining the wt % of alkali metal base in a sample of brominated polystyrene is as follows: Weigh out to the nearest 0.1 gram, a representative 1 to 1.2 gram sample of the brominated polystyrene composition. Place the sample into a 125 milliliter (niL) glass separatory funnel. Add 50 mL of bromochloromethane (BCM) to the separatory funnel and after closing the funnel by means of its stopper, shake the funnel to dissolve the sample. The separatory funnel is then opened by removal of the stopper, and 50 mL of water (pH of 7) is added to the contents of the separatory funnel. The stopper is replaced and the separatory funnel is shaken vigorously to ensure good mixing. Then the funnel in maintained in a quiescent state to enable the liquid phases to separate. The lower BCM layer is drained off and disposed of in a proper and safe manner. The water layer remaining in the separatory funnel is drained into a 100 mL glass beaker. Then the solution is titrated with 0.1 N or 0.01 N HCl using a conventional suitably calibrated automatic titrator. Alternatively, 3–5 drops of a 0.1 wt % phenolphthalein solution in 3A Alcohol is added to the contents in the beaker, and the resultant solution is titrated with 0.1 N or 0.01 N HCl to a colorless endpoint. If the base used in forming the brominated polystyrene composition was sodium hydroxide, the weight percentage of NaOH in the sample (making the assumption that the base in the sample exists as NaOH) is calculated by use of the equation:

$$\text{Wt \% NaOH} = \frac{N(\text{HCl}) \times V(\text{HCl}) \times 40.01\,\text{g/mole of NaOH} \times 100}{1000\,\text{mL/L} \times \text{Sample wt (in grams)}}$$

where N(HCl) is the normality of the HCl used and V(HCl) is the volume of HCl used to reach the end point. The amount of other alkali metal bases can be similarly determined and calculated with appropriate adjustment of the molecular weight factor in the equation.

The procedure for determining pH of the brominated polystyrene composition is as follows: Place in a beaker 1 gram to 1.5 grams of a representative sample, weighed to the nearest 0.1 gram, and dissolve same in 50 mL of BCM. Then add 50 mL of water which has been boiled to remove carbon dioxide and has a pH of 7. Vigorously stir the resultant mixture with a magnetic stirrer such that the two liquid phases are intimately mixed for 2 to 5 minutes. Then reduce the stirrer speed such that the two phases separate in the beaker, and lower the pH electrode in the upper layer only. Measure the pH of the upper layer using a Hach EC-10 pH meter (or equivalent) that has been calibrated the same day.

In addition to the procedure for determining the pH level of the compositions of this invention, other analytical methods can be used in connection with various preferred embodiments of this invention, where the composition not only exhibits the requisite pH by the procedure described above, but in addition has other important properties or attributes, such as high bromine content, low ionic bromide content, appropriate light color, high thermal stability, desired $M_w$ values, and the like.

Since brominated polystyrene has good solubility in solvents such as tetrahydrofuran (THF), the determination of the total bromine content for the brominated polystyrene is easily accomplished by using conventional X-Ray Fluorescence techniques. The sample analyzed is a dilute sample, say 0.1±0.05 g brominated polystyrene in 60 mL THF. The XRF spectrometer can be a Phillips PW1480 Spectrometer.

A standardized solution of bromobenzene in THF is used as the calibration standard. The bromine values described herein and reported in the Examples are all based on the XRF analytical method.

To determine the color attributes of the brominated polystyrenes of this invention, use is again made of the ready solubility of brominated polystyrene in easy-to-obtain solvents, such as chlorobenzene. The analytical method used is quite straight-forward. Weigh 5 g±0.1 g of the brominated polystyrene into a 50 mL centrifuge tube. To the tube also add 45 g±0.1 g chlorobenzene. Close the tube and shake for I hour on a wrist action shaker. After the 1 hour shaking period, examine the solution for undissolved solids. If a haze is present, centrifuge the solution for 10 minutes at 4,000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a Hunter-Lab ColorQuest Sphere Spectrocolorimeter. A transmission cell having a 20-mm transmission length is used. The calorimeter is set to "Delta E-lab" to report color as ΔE and to give color values for "L," "a" and "b".

DSC values were obtained with a TA Instruments DSC Model 2920. Samples were heated from 25° C. to 400° C. at 10° C./min under nitrogen.

Thermogravimetric analysis (TGA) is used to test the thermal behavior of both prior art brominated polystyrene and the brominated polystyrenes of this invention. The TGA values are obtained by use of a TA Instruments Thermogravimetric Analyzer. Each sample is heated on a Pt pan from 25° C. to about 600° C. at 10° C./min with a nitrogen flow of 50–60 ml/min.

The $M_w$ values were obtained by GPC using a Waters model 510 HPLC pump and, as detectors, a Waters Refractive Index Detector, Model 410 and a Precision Detector Light Scattering Detector, Model PD2000. The columns were Waters, μStyragel, 500Å, 10,000Å and 100,000 Å. The autosampler was a Shimadzu, Model Sil 9A. A polystyrene standard ($M_w$=185,000) was routinely used to verify the accuracy of the light scattering data. The solvent used was tetrahydrofuran, HPLC grade. The test procedure used entailed dissolving 0.015–0.020 g of sample in 10 mL of THF. An aliquot of this solution is filtered and 50μL is injected on the columns. The separation was analyzed using software provided by Precision Detectors for the PD 2000 Light Scattering Detector.

The calculated theoretical $M_w$ values were obtained in accordance with the formula:

Theoretical $M_w$ BrPS=$M_w$ PS /(1 - weight percent bromine)

To determine thermal stability and estimate the corrosive potential of a sample, the following test procedure as described in U.S. Pat. No. 5,637,650 was used. Each sample is run in duplicate. A 2.00±0.01 g sample is placed into a new clean 20×150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenophthalein. With a constant nitrogen purge at 0.5 SCFH, the test tube is heated at 300° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 300° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrohm 670, 716, 736, or equivalent). Results are calculated as ppm HBr, ppm HCl, and ppm HBr equivalents as follows:

ppm HBr=(EP 1)(N)(80912)/(sample wt.)

ppm HCl=(EP 2 - EP 1)(N)(36461)/(sample wt.)

ppm HBr equivalents =(EP 2)(N)(80912)/(sample wt.)

where EP(x)=mL of $AgNO_3$ used to reach end point x; and N=normality of $AgNO_3$. The tubing is thoroughly dried with nitrogen before the next analysis. Each day before the first sample, three empty clean test tubes are run as blanks to assure there is no residual hydrogen halide in the system.

As used throughout this application, PS is used interchangeably with and meant to designate polystyrene, while Sty. means styrene. The term "$M_w$" means weight average molecular weight as determined by GPC (light scattering detector) described infra.

Example 1 gives a preferred general procedure for producing brominated polystyrene as described in the commonly-owned prior applications referred to at the outset.

EXAMPLE 1

A mixture of 770.0 g bromochloromethane (BCM, 9 ppm water) and 2.775 g $AlCl_3$ was prepared in a 5-L jacketed glass reactor equipped with a mechanical paddle stirrer, condenser, and thermowell. A jacketed glass mixing tee was mounted on an inlet port on the reactor to which bromine (533.35 g, 3.337 mole) and a solution of 134.00 g (1.287/n mole) polystyrene (Mitsubishi Kasei Polytex, $M_w$=270,000) in 1204 g BCM were pumped at average rates of 8.74 g/min and 20.27 g/min, respectively. The reactor and mixing tee were cooled with a circulating glycol bath to maintain a temperature of 0° C. to 2° C. throughout the 1 hour feed time and subsequent 1 hour cook. The reaction mixture was then washed with water and neutralized with a mixture of aqueous sodium gluconate, sodium sulfite, and sodium hydroxide. After diluting the organic phase with additional BCM (1450 g), the solution was added dropwise to 1.8 L hot (90° C.–94° C.) water containing 0.25 g dioctyl sulfosuccinate sodium salt (surfactant) to precipitate the product and distill the solvent. The slurry was filtered and the off-white solid was washed with water. Drying to constant weight at 150° C. gave 389.8 g.

Examples 2 and 3 prepare brominated polystyrene in accordance with the teachings of U.S. Pat. No. 5,532,322.

EXAMPLE 2 (COMPARATIVE)

A solution of 75.10 g (0.721/n mole) of polystyrene (Mitsubishi Kasei Polytex, $M_w$ 270,000) in 750 g of 1,2-dichloroethane (EDC, containing 12 ppm water) was prepared in a 5-L jacketed glass reactor equipped with a mechanical paddle stirrer, condenser, and thermowell. The temperature of the reaction was controlled with an ethylene glycol circulating bath on the reactor jacket. After cooling to 15° C., 11.03 g of antimony (III) oxide was added to the polystyrene solution. A previously prepared solution of 149.7 g (0.937 mole) bromine and 66.3 g (0.935 mole) chlorine in 505 g cold (−5° C.) EDC was added to the reactor under the liquid surface through a diptube attached to the cooled bromine chloride feed reservoir. The reaction temperature was slowly increased from 10° C. to 25° C. during the 2 hour addition. The mixture was then held at 30° C. until hydrogen halide evolution was complete (1.5 hr) as indicated by an end of the weight gain of the caustic scrubber on the exit gas line from the reactor. The reaction mixture was washed with water and neutralized with aqueous sodium sulfite and caustic. The organic phase was then added dropwise to 3.5 L methanol to precipitate the product. The slurry was filtered and the solid was washed with methanol. After vacuum drying at 150° C., the light yellow solid (product 1) weighed 203.7 g.

EXAMPLE 3 (COMPARATIVE)

Example 2 was repeated using 230.8 g (2.00 mole) commercial bromine chloride with 80.20 g (0.770/n mole) polystyrene and 11.77 g $Sb_2O_3$. The water washed and neutralized organic phase was divided into two equal portions. One portion was added to 1.5 L of methanol as in Example 1 to obtain 101.6 g of light yellow solid (product A) after drying to constant weight at 150° C. The other portion was added dropwise to 1.9 L of hot (89° C.–94° C.) water to precipitate the product and distill the solvent. The dry light yellow solid (product B) weighed 100.3 g.

Example 4 illustrates a preferred process for the formation of a preferred brominated polystyrene composition of this invention.

subjected to the pH determination procedure described above, and (ii) sodium hydroxide powder in an amount such that the resultant mixture contains 0.11 wt % of NaOH. The resultant powder blend gives an aqueous extract having a pH in the range of ca. 9.5–10.5 when subjected to the pH determination procedure described above.

EXAMPLE 6

A powder blend is formed by mixing together Pyro-Chek 68PB flame retardant and 0.11 wt % of finely-divided sodium hydroxide.

In Table I a compilation of the properties of the brominated polystyrene products produced in Examples 1–3 is given. In addition, the properties of Pyro-Chek 68PB flame retardant of Ferro Corporation are given. Pyro-Chek 68PB flame retardant is believed to be produced in accordance with the teachings of U.S. Pat. No. 4,352,909.

TABLE I

ANALYTICAL RESULTS

| Example | 1 | 2 | 3 (A) | 3 (B) | Pyro-Chek 68PB |
|---|---|---|---|---|---|
| Total Br (wt %) | 69.47 | 63.48 | 63.10 | 63.00 | 67.2 |
| Thermal Stability (ppm HBr) | 380 | 3250 | 2560 | 3770 | 1960 |
| Total Cl (wt %) | <0.01 | 1.00 | 0.68 | 0.83 | 0.71 |
| GPC $M_w$ (light scat.) | 920,000 | 560,000 | 580,000 | 580,000 | 620,000 |
| Calc'd. Theo. $M_w$ GPC (light scat.) | 884,000 | 739,000 | 732,000 | 730,000 | —* |
| DSC Tg (° C.) | 190 | 170 | 164 | 162 | 185 |
| DSC Td (° C.) | 389 | 373 | 321 | 322 | no data |
| TGA 1% wt loss @ (° C.) | 349 | 312 | 311 | 293 | 300 |
| Solution Color | | | | | |
| L | 96.32 | 96.21 | 94.99 | 94.62 | 92.03 |
| a | −2.09 | −2.36 | −2.32 | −2.33 | −0.17 |
| b | 11.99 | 15.07 | 16.96 | 17.06 | 23.38 |
| ΔE | 12.72 | 15.71 | 17.83 | 18.03 | 24.70 |

*Calculated Theoretical $M_w$ for Pyro-Chek 68PB cannot be determined since the $M_w$ of the polystyrene reactant used in 68PB is not known.
Tg = glass transition temperature
Td = decomposition temperature

EXAMPLE 4

The procedure of Example 1 is repeated and in the step wherein the reaction mixture is washed with water and neutralized with a mixture of aqueous sodium gluconate, sodium sulfite, and sodium hydroxide, the amount of the aqueous sodium hydroxide is such that a dried sample of the brominated polystyrene composition produced in the process, when subjected to the pH determination procedure described above, gives an aqueous extract having a pH of 9.3.

Examples 5 and 6 illustrate less preferred processes of this invention for introducing the base into a preformed brominated polystyrene. In Example 5, the brominated polystyrene is made substantially as described in Example 16, infra. In Example 6, the brominated polystyrene is Pyro-Chek 68PB flame retardant of Ferro Corporation.

EXAMPLE 5

A powder blend is formed by mixing together (i) brominated polystyrene powder which gives a pH of 8.5 when Examples 7 through 10 illustrate other useful methods of producing brominated polystyrene which can be used in making brominated polystyrene. Preferably the suitable amount of excess inorganic alkali metal base is introduced in the manner described in Example 4. However the powder blending procedure as in Example 5 is also a feasible, though less effective, way of introducing the inorganic alkali metal base.

EXAMPLE 7

A 7.209 g (54.1 mmol) portion of aluminum chloride was suspended (stirred at 250 rpm) in 1549.83 g of dry (10 ppm water) bromochloromethane (BCM) in a 5-L jacketed reaction flask cooled to 0° C. by a circulating glycol bath. A 10.00 wt % solution of PS (360.96 g, 3.4657/nmol) in dry BCM (3250.44 g) was prepared in a second 5-L flask. The polystyrene (PS) used was Styron 612 polystyrene of Dow Chemical Company. The polystyrene had a $M_w$ of 190,000. The PS solution was pumped from the boftom valve of this feed reservoir to a jacketed, glycol-cooled mixing tee mounted on the reaction flask. At the same time, bromine was pumped from a tared feed reservoir to the same mixing tee where it combined with the polystyrene solution before dropping into the stirred catalyst suspension in the reaction flask. Two Masterflex®7550–90 pumps were used. The PS feed system used an all-Teflon feed line with pump head 77390 operating at a constant speed of 60 rpm. This provided a constant feed rate of 21.02/n mmol PS/min (21.89 g/min). The bromine feed system used a combination of Teflon and Viton tubing with pump head 7518–10 operating at a rate of 70.05 mmol/min for the first 18 min, 38.80 mmol/min for 18–23 min, and 56.75 mmoUmin for 23–165 min. Both feeds ended at 165 min. The overall mol ratio of $Br_2$/PS was 2.70. A rinse of 260.95 g of dry BCM was used for the PS solution feed system to assure complete transfer of the polymer to the reaction flask. The reaction temperature was maintained at 0° C. to 4° C. throughout the addition and subsequent 2.3 hour cook period (with nitrogen purge of the reactor overhead). The weight increase for the caustic exit gas scrubber was 665.4 g (87.8% of theory for HBr). The catalyst was deactivated by addition of 125.0 g of a 10 wt % aqueous solution of sodium gluconate. A 63.41 g portion of 10 wt % aqueous sodium sulfite was added, and the pH was adjusted to 14 by addition of 423.0 g of 10 wt % aqueous NaOH. After dilution with BCM (1134.6 g), the organic phase was separated and then washed with water (1011.8 g). The product was recovered from the organic phase by addition to vigorously stirred hot (90° C.–94° C.) water to which was added 1.23 g of the sodium salt of dioctyl sulfosuccinate. The solvent distilled from the hot water leaving a slurry of brominated polystyrene product in water. After suction filtering, the off-white solid was rinsed with water and dried to a constant weight of 1085.98 g (97.9% yield) in a vacuum oven (150° C./2 torr/5 hr).

EXAMPLE 8

The procedur e of Example 7 was followed except that: a 2-L flask and 40 g of polystyrene were used; the $AiCo_3$ wt % (biased on polystyrene) was 2.0 wt %; the feed mole ratio of bromine to polystyrene was 3.33; the total equivalents of bromine was 2.78; the temperature range was 0° C. to 5° C.; the feed times for the bromine/ polystyrene was 32 min/38 min; and the cook time was 150 minutes.

Table II gives some of the properties of the brominated polystyrenes produced in Examples 7 and 8.

TABLE II

RUNS USING PRE-MIXED REACTANTS

| Example | 7 | 8 |
|---|---|---|
| Total Br (wt %) | 68.9 | 69.8 |
| Total Cl (ppm, by XRF) | — | <100 |
| Thermal Stability (ppm HBr) | 104 | 85 |
| TGA 1% wt loss temp. (° C.) | 357 | 375 |
| GPC Wt. Ave. Mol. Wt. (light scat.) | — | 620,000 |
| Calc'd. Theo. $M_w$ (light scat.) | 611,000 | 629,000 |
| Solution Color | | |
| L | 96.47 | 96.86 |
| a | −2.45 | −2.30 |
| b | 14.30 | 11.16 |
| ΔE | 14.90 | 11.84 |

EXAMPLE 9

A 0.910 g (6.82 mmol) portion of aluminum chloride was suspended (stirred at 250 rpm) in 190 g of dry (13 ppm water) bromochloromethane (BCM) in 1-L jacketed flask cooled to 0° C. by circulating glycol bath. A 419.86 g portion of a 10.00 wt % solution of polystyrene (403.1/n mmol) in dry BCM was pumped at a constant rate of 8.46 g/min (8.13 mmol/min) to a jacketed, glycol-cooled mixing tee mounted on the reaction flask. At the same time, bromine was pumped at a constant rate of 6.09 g/min (38.1 mmol/min) to the same mixing tee where it combined with the polystyrene solution (feed mol ratio $Br_2$/PS is 4.69) before dropping into the stirred catalyst suspension in the reaction flask. The bromine feed was stopped after 30.0 min (1143.5 mmol) and the polystyrene solution feed was stopped after 49.6 min (overall mol ratio of $Br_2$/PS is 2.84). A rinse of 160 g of dry BCM was used for the polystyrene solution feed system to assure complete transfer of the polymer to the reaction flask. The reaction temperature was maintained at 0° C.–5° C. throughout the addition and subsequent 2 hr cook period. The catalyst was deactivated by addition of 16.4 g of 10 wt % aqueous solution of sodium gluconate, and pH was adjusted to 14 by addition of 60.7 g of 10 wt % aqueous NaOH. The reaction mixture was washed with 10 wt % aqueous sodium sulfite followed by a water wash. The product was recovered from the organic phase by addition to vigorously stirred hot (90° C.) water containing 0.02 wt % dioctyl sulfosuccinate sodium salt surfactant. The solvent distilled from the hot water leaving a slurry of the brominated polystyrene product in water. After filtering, the powdery solid was rinsed with water and dried to constant weight in a vacuum oven (150° C./2 torr/5 hr). The dry solid weighed 127.08 g (95% yield). The product contained 69.6 wt % total Br. The HunterLab solution color (10 wt % in chlorobenzene) values were L=94.58, a=−2.79, b=17.29, Delta E=18.34.

EXAMPLE 10

A Y-shaped mixing apparatus having a cooling jacket was equipped with 2 feed lines, each connected to a pump. One of the feed lines was for delivering bromine and the other was for delivering a PS and BCM solution. Bromine (93.3 g, 31.3 ml or 0.583 mole), delivered at a rate of 1 ml/min (19.4 mmol/min), and a PS/BCM solution (22.4 g PS, 0.215 mole and 97 ml or 194 g of anhydrous BCM), delivered at 4 ml/min (7.17 mmol/min), were fed simultaneously from their respective feed lines into the cooled (5° C.) Y-mixing apparatus. The resultant intimate mixture from the mixing apparatus was then fed into a cooled (5° C.) suspension of 0.45 g (2 wt % based on PS) of aluminum chloride in 49 mL (98 g) of anhydrous BCM. Evolved HBr was scrubbed by a caustic solution during the reaction. The feeds were complete in 35 minutes and the mixture was cooked for 2 hours at 5° C. After water and sodium sulfite washes, solid BrPS was isolated by precipitating from 500 ml of hot (90° C.) water as described above. A total of 66 g of BrPS (97% yield) was obtained. The product contained 68.4 wt % total Br. The HunterLab solution color (10 wt % in chlorobenzene) values were L=96.74, a=−1.90, b=15.99, Delta E=16.44.

Examples 11–24 illustrate additional preferred procedures for producing brominated polystyrenes well suited for use in forming compositions of this invention.

EXAMPLES 11–24

The following procedure was used in these Examples: A mixture of 1.44 g (10.8 mmol) of aluminum chloride (Aldrich, anhydrous) and 310 g of dry (10–60 ppm water after drying over molecular sieves) bromochloromethane (BCM) was stirred at 350 rpm with a paddle of Teflon® polymer in a 1 -L three-necked jacketed round bottom flask.

The flask contents were cooled to the desired temperature by circulating chilled ethylene glycol through the jacket. A 10 wt % solution of Dow Styron 612 polystyrene (72.2 g; 0.69 equivalents) in dry BCM (650 g) was charged to a separate vessel (500 mL graduated addition funnel). The polystyrene solution was pumped from the bottom of this feed reservoir to a vacuum jacketed mixing tee mounted on the reaction flask. The tee was maintained at the same temperature as the reaction mixture by circulating the ethylene glycol exiting from the flask to the tee. As the polystyrene solution was pumped from the reservoir, bromine (295.5 g; 1.85 mole) was simultaneously pumped from a 125 mL graduated addition funnel to the same mixing tee where it combined with the polystyrene solution. The resulting red solution flowed through the jacketed, spiral column (approximately 12" in length) and exited above the surface of the stirred catalyst suspension. Two Masterflex pumps were used for the feed to the mixing tee. The polystyrene system used an all Teflon line with a Cole-Palmer 77390 pump head. The bromine feed system used a combination of Teflon and Viton tubing with the latter being used with a Masterflex 7518-10 pump head. Both feeds ended in approximately 32–35 minutes. Constant attention to feed rates was necessary in order to achieve complete addition simultaneously. The overall mole ratio of $Br_2$/PS was 2.7. A rinse of 57 g of dry BCM was used for the polystyrene solution feed system to assure complete transfer of the polymer to the reaction flask. After the addition was complete, the reaction was stirred at temperature for 45 minutes while being swept with nitrogen and was then quenched by the addition of 13 g of a 10 wt % solution of sodium sulfite. During the quench the material was stirred at 450 rpm and was stirred at this rate for 5 minutes. The reaction color changed from redibrown to a cream (light tan) during the sulfite addition. The reaction was allowed to stand for 5 minutes and the phases were separated using a bottom valve on the reaction flask. After removing the aqueous phase from the reactor, the organic layer was returned to the reactor and the pH was adjusted to 14 with the use of 10 wt % aqueous NaOH (100–200 g). Additional BCM (267 g) was added, the mixture was transferred to a separatory funnel, and the phases were allowed to separate. Product was recovered from the organic phase by addition to hot water as follows. A 2L three-necked creased flask equipped with a mechanical stirrer, 125 mL addition funnel, thermometer, and Dean-Stark trap with a condenser was charged with 700 mL of water and heated to 92–94° C. with a heating mantle. The addition funnel was filled with the contents from the bottom phase of the separatory funnel. The feed rate from the addition funnel was controlled so that the condenser on the Dean-Stark trap was not overloaded and so that the water temperature did not fall below 91° C. BCM and some water were removed overhead while the product precipitated in the water as white to yellowish-white solids. The addition funnel was refilled as necessary to have a continuous flow of material to the flask. After the addition was complete, the slurry was stirred at temperature for about 10 minutes to ensure complete removal of BCM. The slurry was allowed to cool to about 65° C. and collected on a Buchner funnel using suction filtration through #2 filter paper. About 300 mL of hot water was used to rinse the flask and the filter cake. The solids were transferred to a 2L beaker, thoroughly mixed with 400 mL of water and reisolated by suction filtration. The solids were air dried overnight and then dried at 150° C. in a vacuum oven (1–5 mm Hg) until a constant weight (180–200 g) was achieved. The product was powdered with a mortar and pestle prior to analysis (see Table III).

TABLE III

ANALYTICAL RESULTS

| Example | 11 | 12 | 13 | 14 | 15 | 16 | 17 |
|---|---|---|---|---|---|---|---|
| Reaction Temp. (° C.) | −10 | −10 | −10 | −10 | 0 | 0 | 0 |
| Total Br (wt %) | 68.7 | 68.8 | 69.2 | 68.3 | 69.3 | 70.1 | 68.5 |
| Thermal Stability (ppm HBr) | 312 | 267 | 289 | 328 | 330 | 196 | 115 |
| Hunter Lab Soln. Color (10% PhCl) | | | | | | | |
| L | 98.09 | 97.64 | 97.74 | 97.75 | 97.14 | 97.51 | 96.79 |
| a | −1.70 | −1.83 | −1.51 | −1.54 | −2.12 | −1.59 | −2.33 |
| b | 7.98 | 8.56 | 7.55 | 8.10 | 9.78 | 7.90 | 11.08 |
| ΔE | 8.38 | 9.07 | 8.02 | 8.55 | 10.40 | 8.43 | 11.77 |
| TGA 1% Wt loss Temp/$N_2$ (° C.) | 351 | 353 | 358 | 353 | 355 | 356 | 347 |
| GPC mol. Wt. (light scat. detect.) | | | | | | | |
| $M_2$ (×$10^3$) | 595 | 601 | 580 | 631 | 634 | 572 | 645 |
| Calc'd $M_2$ (×$10^3$) | 607 | 609 | 617 | 599 | 619 | 635 | 603 |
| $M_w/M_w$ (Calc'd) | 0.98 | 0.99 | 0.94 | 1.05 | 1.02 | 0.90 | 1.07 |

| Example | 18 | 19 | 20 | 21 | 22 | 23 | 24 |
|---|---|---|---|---|---|---|---|
| Reaction Temp. (° C.) | 0 | 10 | 10 | 10 | 20 | 20 | 20 |
| Total Br (wt %) | 68.6 | 69.0 | 69.1 | 68.9 | 69.2 | 68.7 | 68.7 |
| Thermal Stability (ppm HBr) | 74 | 222 | 203 | 194 | 349 | 313 | 249 |
| Hunter Lab Soln. Color (10% PhCl) | | | | | | | |
| L | 97.31 | 96.47 | 96.88 | 96.56 | 94.40 | 94.70 | 94.43 |
| a | −2.32 | −3.12 | −2.83 | −2.57 | −3.18 | −3.40 | −3.23 |
| b | 10.10 | 14.63 | 12.98 | 13.09 | 22.79 | 22.17 | 23.92 |
| ΔE | 10.71 | 15.38 | 13.65 | 13.77 | 23.68 | 23.05 | 24.78 |

TABLE III-continued

ANALYTICAL RESULTS

| | | | | | | | |
|---|---|---|---|---|---|---|---|
| TGA 1% Wt loss Temp/N$_2$ (° C.) | 351 | 352 | 347 | 349 | 342 | 347 | 344 |
| GPC mol. Wt. (light scat. detect.) | | | | | | | |
| M$_2$ (×10$^3$) | 583 | 673 | 694 | 819 | 886 | 863 | 831 |
| Calc'd M$_2$ (×10$^3$) | 605 | 613 | 615 | 611 | 617 | 607 | 607 |
| M$_w$/M$_w$ (Calc'd) | 0.96 | 1.10 | 1.13 | 1.34 | 1.44 | 1.42 | 1.37 |

Inclusion of the suitable amount of inorganic alkali metal base such as NaOH or KOH into the brominated polystyrenes of Examples 11–24 is preferably accomplished substantially in the manner described in Example 4 by utilizing a suitable excess of aqueous NaOH (or KOH) when precipitating the brorninated polystyrene from BCM$_w$, and either eliminating the final water wash step or substituting an aqueous NaOH (or KOH) solution as the final wash. Alternatively, and less preferably, brominated polystyrenes formed as described in Examples 11–24 in finely-divided or powder form can be powder blended with suitable quantities of powdered alkali metal base such as sodium hydroxide, sodium acetate, or potassium hydroxide.

A brominated polystyrene composition of this invention was subjected to thermal stability and metal corrosivity testing. The composition had an NaOH content using the above-described analytical procedure of 0.11 wt % (based on the assumption that the base present therein was NaOH). When the composition of this invention was dissolved in bromochloromethane and the resultant solution was extracted with water, the resultant water extract exhibited a pH of 9.3. For thermal stability evaluation, a dried sample of the composition of this invention was exposed to a constant temperature of 315° C. for 1 hour. The sample had a light tan color after such treatment. In contrast, a number of samples of brominated polystyrene not having an inorganic alkali metal base content yielding the requisite pH pursuant to this invention turned black under these high temperature test conditions. In the metal corrosivity test a mild carbon steel coupon was partially submerged in the brominated polystyrene composition disposed in the bottom portion of a glass sample vial. The vial was then maintained in a air-circulating oven for one hour at 315° C. Then the extent of corrosion on the test coupon as evidenced by pitting and surface darkening was determined, and found to be very low. Two samples of very similar brominated polystyrenes not having an inorganic alkali metal base content yielding the requisite pH pursuant to this invention showed medium corrosion under the same test conditions.

The brominated polystyrene flame retardant additive compositions of this invention are characterized by containing no polymer other than the brominated polystyrene itself. In other words, the brominated polystyrene is the sole polymeric ingredient of the flame retardant additive whether in the form of a powder blend, a blend formed by adding the alkali metal base to molten brominated polystyrene, or a composition produced in particulate form by precipitation from a solution of brominated polystyrene, and wherein the alkali metal base is incorporated into the brominated polystyrene by performing the precipitation in contact with a solution of an alkali metal base. Other additive ingredients may be included in the flame retardant additive compositions of this invention. In preferred embodiments the compositions of this invention are composed solely of (a) the brominated polystyrene, (b) one or more alkali metal bases in an amount less than about 1 wt % such that if the flame retardant is dissolved in bromochloromethane and the resultant solution is extracted with water, the resultant water extract exhibits a pH of at least about 9.0, and (c) trace amounts (e.g., less than about 0.5 wt % total) of residues from other chemicals used during the preparation and precipitation of the brominated polystyrene. When the original base is a strong base such as NaOH, KOH, Na$_2$O, or K$_2$O (whether hydrated or anhydrous), the amount of base in the resultant brominated polystyrene is most preferably no more than 0.25 wt %, and better yet, is no more than 0.15 wt % based on the total weight of the composition.

It is to be understood that the components referred to by chemical name or formula anywhere in the specification or claims hereof, whether referred to in the singular or plural, are identified as they exist prior to coming into contact with another substance referred to by chemical name or chemical type (e.g., another component, a solvent, or, etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Even though the claims hereinafter may refer to substances, components and/or ingredients in the present tense ("comprises," "is," etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. Brominated polystyrene flame retardant which contains alkali metal base in an amount less than about 1 wt % such that if the flame retardant is dissolved in bromochloromethane and the resultant solution is extracted with water, the resultant water extract exhibits a pH of at least about 9.0.

2. Flame retardant in accordance with claim 1 wherein said flame retardant is produced in particulate form by precipitation from a solution of brominated polystyrene, and wherein the base is incorporated into the brominated polystyrene by performing the precipitation in contact with a solution of at least one basic alkali metal compound.

3. Flame retardant in accordance with claim 1 or 2 wherein the alkali metal base in, or in admixture with, the brominated polystyrene flame retardant originally was at least one inorganic base.

4. Flame retardant in accordance with claim 1 or 2 wherein said base originally was an alkali metal hydroxide.

5. Flame retardant in accordance with claim 1 or 2 wherein said base originally was sodium hydroxide.

6. Flame retardant in accordance with claim 1 wherein said pH is in the range of about 9.5 to about 11.

7. Flame retardant in accordance with claim 6 wherein said flame retardant is produced in particulate form by precipitation from a solution of brominated polystyrene, and wherein the base is incorporated into the brominated polystyrene by performing the precipitation in contact with a solution of alkali metal base.

8. Flame retardant in accordance with claim 6 or 7 wherein said base originally was at least one inorganic base.

9. Flame retardant in accordance with claim 6 or 7 wherein said base originally was an alkali metal hydroxide.

10. Flame retardant in accordance with claim 6 or 7 wherein said inorganic base originally was sodium hydroxide.

11. Flame retardant in accordance with claim 1 wherein said pH is in the range of about 10 to about 10.5.

12. Flame retardant in accordance with claim 11 wherein said flame retardant is produced in particulate form by precipitation from a solution of brominated polystyrene, and wherein the base is incorporated into the brominated polystyrene by performing the precipitation in contact with a solution of alkali metal base.

13. Flame retardant in accordance with claim 11 or 12 wherein said base originally was at least one inorganic base.

14. Flame retardant in accordance with claim 11 or 12 wherein said base originally was an alkali metal hydroxide.

15. Flame retardant in accordance with claim 11 or 12 wherein said base originally was sodium hydroxide.

16. Brominated polystyrene which contains less than about 500 ppm Cl, which has a TGA temperature for 1% weight loss which is 340° C. or higher, and which contains alkali metal base in an amount of less than about 1 wt % such that if the brominated polystyrene is dissolved in bromochloromethane and the resultant solution is extracted with water, the resultant water extract exhibits a pH of at least about 9.0.

17. Brominated polystyrene in accordance with claim 16 wherein the TGA temperature is within the range of from about 340° C. to about 380° C.

18. Brominated polystyrene in accordance with claim 17 wherein said base originally was at least one inorganic base.

19. Brominated polystyrene in accordance with claim 18 wherein said inorganic base originally was an alkali metal hydroxide.

20. Brominated polystyrene in accordance with claim 17 wherein said brominated polystyrene is in particulate form produced by precipitation from a solution of brominated polystyrene, and wherein the base is incorporated into the brominated polystyrene by performing the precipitation in contact with a solution of alkali metal base.

21. Brominated polystyrene in accordance with claim 20 wherein said base originally was at least one inorganic base.

22. Brominated polystyrene in accordance with claim 21 wherein said inorganic base originally was an alkali metal hydroxide.

23. Brominated polystyrene in accordance with claim 21 wherein said inorganic base originally was sodium hydroxide or potassium hydroxide, or both.

24. Brominated polystyrene in accordance with claim 16 wherein the TGA temperature is within the range of from about 345° C. to about 380° C.

25. Brominated polystyrene in accordance with claim 24 wherein said base originally was at least one inorganic base.

26. Brominated polystyrene in accordance with claim 25 wherein said inorganic base originally was an alkali metal hydroxide.

27. Brominated polystyrene in accordance with claim 24 wherein said brominated polystyrene is in particulate form produced by precipitation from a solution of brominated polystyrene, and wherein the base is incorporated into the brominated polystyrene by performing the precipitation in contact with a solution of alkali metal base.

28. Brominated polystyrene in accordance with claim 27 wherein said base originally was at least one inorganic base.

29. Brominated polystyrene in accordance with claim 28 wherein said inorganic base originally was an alkali metal hydroxide.

30. Brominated polystyrene in accordance with claim 28 wherein said inorganic base originally was sodium hydroxide or potassium hydroxide, or both.

31. A brominated polystyrene (i) which has an actual $M_w$ that is within about 20% of its calculated theoretical $M_w$, the theoretical $M_w$ being based upon (a) the actual bromine content of the brominated polystyrene and (b) the $M_w$ of the polystyrene reactant used to produce the brominated polystyrene, and (ii) which contains alkali metal base in an amount such that if the brominated polystyrene is dissolved in bromochloromethane and the resultant solution is extracted with water, the resultant water extract exhibits a pH of at least about 9.0.

32. Brominated polystyrene of claim 31 wherein the actual $M_w$ is within about 10% of the theoretical $M_w$.

33. Brominated polystyrene in accordance with claim 32 wherein said base originally was at least one inorganic base.

34. Brominated polystyrene in accordance with claim 33 wherein said inorganic base originally was an alkali metal hydroxide.

35. Brominated polystyrene in accordance with claim 32 wherein said brominated polystyrene is in particulate form produced by precipitation from a solution of brominated polystyrene, and wherein the base is incorporated into the brominated polystyrene by performing the precipitation in contact with a solution of alkali metal base.

36. Brominated polystyrene in accordance with claim 35 wherein said base originally was at least one inorganic base.

37. Brominated polystyrene in accordance with claim 36 wherein said inorganic base originally was sodium hydroxide or potassium hydroxide, or both.

38. A brominated polystyrene comprised of polymer units of the formula:

wherein each X is independently a hydrogen atom or a bromine atom or a chlorine atom, the identity of each X for each polymer unit being such that the brominated polystyrene, if heated at 300° C. for 15 minutes at ambient atmospheric pressure, evolves less than about 750 ppm (wt/wt) of hydrogen bromide; wherein the brominated polystyrene contains at least about 65 wt % bromine; wherein the total chlorine content, if any, of the brominated polystyrene is no more than about 500 ppm (wt/wt); and wherein the brominated polystyrene contains alkali metal base in an amount such that if the brominated polystyrene is dissolved in bromochloromethane and the resultant solution is extracted with water, the resultant water extract exhibits a pH of at least about 9.0.

39. Brominated polystyrene in accordance with claim 38 wherein the bromine content is at least about 67 wt %.

40. Brominated polystyrene in accordance with claim 38 wherein said base originally was at least one inorganic base.

41. Brominated polystyrene in accordance with claim 40 wherein said inorganic base originally was an alkali metal hydroxide.

42. Brominated polystyrene in accordance with claim 38 wherein said brominated polystyrene is in particulate form produced by precipitation from a solution of brominated polystyrene, and wherein the base is incorporated into the brominated polystyrene by performing the precipitation in contact with a solution of alkali metal base.

43. Brominated polystyrene in accordance with claim 42 wherein said base originally was at least one inorganic base.

44. Brominated polystyrene in accordance with claim 43 wherein said inorganic base originally was sodium hydroxide or potassium hydroxide, or both.

45. Brominated polystyrene which has a TGA temperature for 1% weight loss which is 340° C. or higher, and which contains alkali metal base in an amount less than about 1 wt % such that if the brominated polystyrene is dissolved in bromochloromethane and the resultant solution is extracted with water, the resultant water extract exhibits a pH of at least about 9.0.

46. Brominated polystyrene in accordance with claim 45 wherein the brominated polystyrene is in particulate form produced by precipitation from a solution of brominated polystyrene, and wherein the base is incorporated into the brominated polystyrene by performing the precipitation in contact with a solution of alkali metal base.

47. Brominated polystyrene which is essentially free of impurities selected from the group consisting of bromodichloroethane, dibromochloroethane, dibromodichloroethane, tribromochloroethane and any mixture of two or more of the foregoing, and which contains alkali metal base in an amount less than about 1 wt % such that if the brominated polystyrene is dissolved in bromochloromethane and the resultant solution is extracted with water, the resultant water extract exhibits a pH of at least about 9.0.

48. Brominated polystyrene in accordance with claim 47 wherein the brominated polystyrene is in particulate form produced by precipitation from a solution of brominated polystyrene, and wherein the base is incorporated into the brominated polystyrene by performing the precipitation in contact with a solution of alkali metal base.

49. Brominated polystyrene (i) which contains less than about 500 ppm Cl, (ii) which has a TGA temperature for 1% weight loss which is 340° C. or higher, (iii) which has an actual $M_w$ that is within about 20% of its calculated theoretical MW, the theoretical K being based upon (a) the actual bromine content of the brominated polystyrene and (b) the $M_w$ of the polystyrene reactant used to produce the brominated polystyrene, and (iv) which contains alkali metal base in an amount of less than about 1 wt % such that if the brominated polystyrene is dissolved in bromochloromethane and the resultant solution is extracted with water, the resultant water extract exhibits a pH of at least about 9.0.

50. Brominated polystyrene in accordance with claim 49 which, if heated at 300° C. for 15 minutes at ambient atmospheric pressure, evolves less than about 750 ppm (wt/wt) of hydrogen bromide; and which contains at least about 65 wt % bromine.

51. Brominated polystyrene in accordance with claim 50 which is essentially free of impurities selected from the group consisting of bromodichloroethane, dibromochloroethane, dibromodichloroethane, tribromochloroethane and any mixture of two or more of the foregoing.

52. Brominated polystyrene in accordance with claim 51 wherein the brominated polystyrene is in particulate form produced by precipitation from a solution of brominated polystyrene, and wherein the base is incorporated into the brominated polystyrene by performing the precipitation in contact with a solution of alkali metal base.

53. Brominated polystyrene in accordance with claim 52 wherein said base originally was at least one inorganic base.

54. Brominated polystyrene in accordance with claim 53 wherein said inorganic base originally was sodium hydroxide or potassium hydroxide, or both.

55. A process which comprises:
a) contacting (i) a solution of brominated polystyrene in an organic solvent that boils at a temperature in the range of at least about 35° C. and below about 150° C. and (ii) water in the presence of alkali metal base to form a mixture;
b) contacting the mixture of a) with an amount of steam or water which is at a temperature high enough such that at least a portion of said organic solvent distills off and particles of brominated polystyrene containing alkali metal base are formed; with the proviso that the amount of alkali metal base in said particles of brominated polystyrene is less than about 1 wt % and is such that if the brominated polystyrene is dissolved in bromochloromethane and the resultant solution is extracted with water, the resultant water extract exhibits a pH of at least about 9.0.

56. A process in accordance with claim 55 wherein said solution of alkali metal base is an aqueous solution of at least one inorganic alkali metal base.

57. A process in accordance with claim 55 wherein said solution of alkali metal base is an aqueous alkali metal hydroxide solution.

58. A process in accordance with claim 55 wherein said solution of alkali metal base is an aqueous sodium hydroxide solution.

59. A process in accordance with claim 55 wherein said pH is in the range of about 9.5 to about 11.

60. A process in accordance with claim 55 wherein said pH is in the range of about 10 to about 10.5.

61. A process in accordance with claim 55 wherein the organic solvent of said solution of brominated polystyrene is dichloromethane, 1,2-dichioroethane, or bromochloromethane.

62. A process in accordance with claim 55 wherein the organic solvent of said solution of brominated polystyrene is bromochloromethane.

63. A process in accordance with claim 55 wherein the organic solvent of said solution of brominated polystyrene is dichloromethane, 1,2-dichloroethane, or bromochloromethane; wherein said solution of alkali metal base is an aqueous alkali metal hydroxide solution; and wherein said pH is in the range of about 9.5 to about 11.

64. A process in accordance with claim 55 wherein the organic solvent of said solution of brominated polystyrene is bromochloromethane; wherein said solution of alkali metal base is an aqueous sodium hydroxide solution; and wherein said pH is in the range of about 10 to about 10.5.

65. A process in accordance with claim 55 wherein the organic solvent of said solution of brominated polystyrene is bromochloromethane; wherein said solution of alkali metal base is (a) an aqueous sodium hydroxide solution, (b) an aqueous potassium hydroxide solution, or (c) an aqueous sodium hydroxide and potassium hydroxide solution; and wherein said pH is in the range of about 9.5 to about 11.

66. A process which comprises introducing (i) a solution of brominated polystyrene in an organic solvent that boils at a temperature in the range of at least about 35° C. and below about 150° C., and (ii) a solution of alkali metal base, into an amount of steam or water which is at a temperature high enough such that at least a portion of the organic solvent distills off and particles of brominated polystyrene containing alkali metal base are formed; the relative proportions of brominated polystyrene and alkali metal base being such that (a) the amount of alkali metal base in said particles of brominated polystyrene is less than about 1 wt %, and (b) if the brominated polystyrene is dissolved in bromochloromethane and the resultant solution is extracted with water, the resultant water extract exhibits a pH of at least about 9.0.

67. A process in accordance with claim 66 wherein said solution of alkali metal base is an aqueous solution of at least one inorganic alkali metal base.

68. A process in accordance with claim 66 wherein said solution of alkali metal base is an aqueous alkali metal hydroxide solution.

69. A process in accordance with claim 66 wherein said solution of alkali metal base is an aqueous sodium hydroxide solution.

70. A process in accordance with claim 66 wherein said pH is in the range of about 9.5 to about 11.

71. A process in accordance with claim 66 wherein said pH is in the range of about 10 to about 10.5.

72. A process in accordance with claim 66 wherein the organic solvent of said solution of brominated polystyrene is dichloromethane, 1,2-dichloroethane, or bromochloromethane.

73. A process in accordance with claim 66 wherein the organic solvent of said solution of brominated polystyrene is bromochloromethane.

74. A process in accordance with claim 66 wherein the organic solvent of said solution of brominated polystyrene is dichloromethane, 1,2-dichloroethane, or bromochloromethane; wherein said solution of alkali metal base is an aqueous alkali metal hydroxide solution; and wherein said pH is in the range of about 9.5 to about 11.

75. A process in accordance with claim 66 wherein the organic solvent of said solution of brominated polystyrene is bromochloromethane; wherein said solution of alkali metal base is an aqueous sodium hydroxide solution; and wherein said pH is in the range of about 10 to about 10.5.

76. A process in accordance with claim 66 wherein the organic solvent of said solution of brominated polystyrene is bromochloromethane; wherein said solution of alkali metal base is (a) an aqueous sodium hydroxide solution, (b) an aqueous potassium hydroxide solution, or (c) an aqueous sodium hydroxide and potassium hydroxide solution; and wherein said pH is in the range of about 9.5 to about 11.

* * * * *

UNITED STATES PATENT AND TRADEMARK OFFICE
CERTIFICATE OF CORRECTION

PATENT NO. : 6,133,381
DATED : Oct. 17, 2000
INVENTOR(S) : Jon S. Reed; Charles H. Kolich; Billie B. Dadgar; Donald E. Balhoff; Meng-Sheng Ao; Homer C. Lin; Thorsten W. Brockmann; David R. Brackenridge It is certified that error appears in the above-identified patent and that said Letters Patent is hereby corrected as shown below:

Title page,
Item [73] reads: "[73] Assignee: Albelmarle Corporation, Richmond, VA." and should read: -- [73] Assignee: Albemarle Corporation, Richmond, VA. --.

Column 30,
Line 9, reads "...MW,..." and should read -- ...$M_w$,... --; and reads "...K..." and should read -- ...$M_w$... --.
Lines 45-55, reads:

"b)  contacting the mixture of a) with an amount of steam or water which is at a temperature high enough such that at least a portion of said organic solvent distills off and particles of brominated polystyrene containing alkali metal base are formed; with the proviso that the amount of alkali metal base in said particles of brominated polystyrene is less than about 1wt% and is such that if the brominated polystyrene is dissolved in bromochloromethane and the resultant solution is extracted with water, the resultant water extract exhibits a pH of at least about 9.0."

and should read:

-- b)  contacting the mixture of a) with an amount of steam or water which is at a temperature high enough such that at least a portion of said organic solvent distills off and particles of brominated polystyrene containing alkali metal base are formed; with the proviso that the amount of alkali metal base in said particles of brominated polystyrene is less than about 1 wt % and is such that if the brominated polystyrene is dissolved in bromochloromethane and the resultant solution is extracted with water, the resultant water extract exhibits a pH of at least about 9.0. --.

UNITED STATES PATENT AND TRADEMARK OFFICE
CERTIFICATE OF CORRECTION

PATENT NO. : 6,133,381
DATED : Oct. 17, 2000
INVENTOR(S) : Jon S. Reed; Charles H. Kolich; Billie B. Dadgar; Donald E. Balhoff; Meng-Sheng Ao; Homer C. Lin; Thorsten W. Brockmann; David R. Brackenridge It is certified that error appears in the above-identified patent and that said Letters Patent is hereby corrected as shown below:

Column 31,
Line 3, reads "..., 1,2-dichioroethane,..." and should read
-- ..., 1,2-dichloroethane,... --.

Signed and Sealed this

Twelfth Day of March, 2002

Attest:

Attesting Officer

JAMES E. ROGAN
Director of the United States Patent and Trademark Office